United States Patent [19]

Bitonti

[11] Patent Number: 4,641,698

[45] Date of Patent: Feb. 10, 1987

[54] AUTOMATED VEHICLE TIRE PRESSURIZATION SYSTEM

[75] Inventor: Frank E. Bitonti, Detroit, Mich.

[73] Assignee: AM General Corporation, Livonia, Mich.

[21] Appl. No.: 669,588

[22] Filed: Nov. 8, 1984

[51] Int. Cl.$^4$ .............................................. B60C 23/14
[52] U.S. Cl. .................................... 152/416; 137/223; 141/38
[58] Field of Search .................... 152/415, 416, 417; 137/223, 224, 227, 228; 141/38

[56] References Cited

U.S. PATENT DOCUMENTS

| | | | |
|---|---|---|---|
| 2,685,906 | 8/1954 | Williams | 152/417 |
| 3,099,309 | 7/1963 | Horta et al. | 152/416 |
| 3,240,240 | 3/1966 | Crabb | 152/416 |
| 4,313,483 | 2/1982 | Brockmann | 152/416 |

FOREIGN PATENT DOCUMENTS

| | | | |
|---|---|---|---|
| 2141087 | 2/1973 | Fed. Rep. of Germany | 152/416 |
| 2612332 | 10/1976 | Fed. Rep. of Germany | 152/416 |

*Primary Examiner*—Lois E. Boland
*Attorney, Agent, or Firm*—Brooks & Kushman

[57] ABSTRACT

A system for automated pressurization of pneumatic tires includes an air pump which is driven by the vehicle engine and provides a continuous output of pressurized air. The pressurized air can either be routed to the tires or vented to the atmosphere under control of a manually-actuated selector valve having inflate, neutral and deflate modes of operation. A second selector valve can be set to designate which of the vehicle tires are to be inflated or deflated.

29 Claims, 2 Drawing Figures

AUTOMATED VEHICLE TIRE PRESSURIZATION SYSTEM

TECHNICAL FIELD

This invention relates to a system for automatically controlling the pressurization of vehicle tires.

BACKGROUND ART

There are a number of types of land vehicles equipped with pneumatic tires whose service requirements call for operation on varying terrain, e.g. soft sand, snow and hard surface roads. The traction of these vehicles can be enhanced to match the terrain by adjusting the pressurization of the pneumatic tires. This capability is obtained by equipping the vehicle with an automated system for controlled inflation or deflation of the vehicle tires in response to an operator command.

This type of system is broadly known in the prior art and can take a number of alternative embodiments. A feature typical to many of the embodiments is the use of an air pressure tank or reservoir for supplying air to the vehicle tires in response to an operator command to inflate the tires. However, an air pressure tank and its related pneumatic control circuitry introduce complexity into the system design and add cost and weight to the product.

Similarly, in prior systems the control of air flow is commonly implemented by solenoid relays which open and close valves in response to electrical signals. In order to accommodate the pressures and quantities of air necessary for practical operation of this type of system the solenoid relays must be relatively large, and this is reflected in the cost, size and weight of the pneumatic control circuitry. It is also apparent that use of electrical components in the design of a pneumatic control circuit will also introduce usual concerns of reliability and system complexity.

The following U.S. patents disclose vehicle tire inflation systems of background interest to the present invention: U.S. Pat. Nos. 1,241,696; 1,329,876; 1,855,101; 2,010,150 and 3,099,309.

DISCLOSURE OF THE INVENTION

The present invention provides a system for automated pressurization of vehicle tires which meets the objectives of avoiding the need for an air pressure tank or reservoir and is implemented without electrical components in the pneumatic control circuit. The invention is further distinguished by its simplicity and applicability to vehicles of conventional design.

More specifically, in its preferred embodiment the present system uses an air pump that is driven by the vehicle engine to provide a continuous output of pressurized air. The pressurized air is routed through a pneumatic control circuit to the vehicle tires when the operator places the system in its inflate mode. The air output by the pump is vented to the atmosphere when the operator selects the neutral mode for pressure maintenance. In the neutral mode the pressure differential across the pump reflects line losses only. In the deflate mode for tire deflation, the air from the tires is vented to the atmosphere and the air from the pump is vented to the atmosphere through a pressure relief valve. The pressure relief valve is functional in the deflate mode to apply maximum system pressure to the pneumatic control circuit and thereby actuate pilot valve which open to permit tire ventilation. The upper limit of system pressure is defined by the set point of the pressure relief valve.

The mode selection is made through a manually actuatable selector valve placed on the instrument panel or other place accessible to the vehicle operator. The selector valve responds to an operator command to place the pneumatic circuitry in either its inflate, neutral or deflate modes. The operator is informed when the tires obtain the desired pressure level by a feedback signal, representative of tire pressure, displayed on a pressure gauge.

The system also permits the operator to inflate or deflate fewer than all of the vehicle tires, e.g. the tires on a selected axle. This feature is obtained through use of a second manually actuatable selector valve which operates in conjunction with the pneumatic control circuit.

The system of the present invention possesses the additional capabilities of being able to be charged from an external source of pressurized air, and provides for isolation of each of the vehicle tires from the pneumatic circuit in the event of tire rupture or other failure. These and additional features and advantages of the present invention will become evident in the following detailed description.

BEST MODE FOR CARRYING OUT THE INVENTION

I. Description of the Wheel End Assembly

Figure 1:
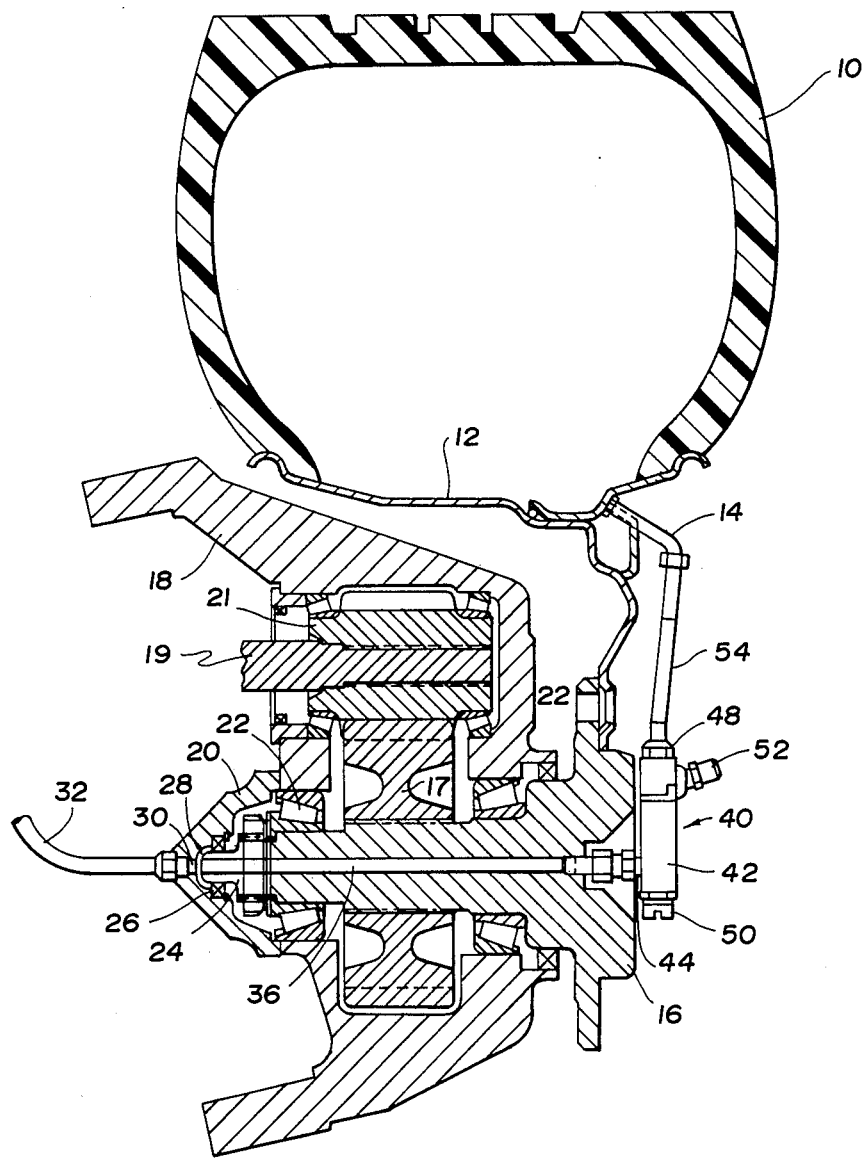
FIG. 1 is a vertical section view of a vehicle wheel assembly.

FIG. 1 illustrates a wheel end assembly adapted for automated tire inflation and deflation in accordance with the present invention. A tire 10 is mounted on a wheel 12 in a conventional manner. The tire has a port at 14 for admitting air or ventilating air from its interior volume.

The wheel 12 is mounted on and co-rotational with a spindle 16. The spindle is carried by a geared hub housing 18. At the inboard end of the housing 18 is a cap or bonnet 20 which encloses the inner end of the spindle 16. The spindle 16 is rotational within the housing 18 and the cap 20 and is supported by a conventional bearing set 22. The spindle 16 is engaged with and driven by the inner pinion of a lower gear 17. The drive torque to the lower gear 17 is transmitted through an axle shaft pinion 19 and upper gear 21.

At its innermost end the spindle 16 tapers to a pilot segment 24. The pilot segment has an outer finished surface which rotates within a seal 26 to define an air chamber 28 bound by the inner surface of the cap 20, the outer surface of inboard end of the pilot 24 and the seal 26.

The cap 20 has a central aperture 30. The aperture 30 is threaded and fitted with an air line 32 for communicating the wheel assembly with the pneumatic control circuitry of the system.

The passage of air between the tire 10 and the pneumatic circuit of the system is therefore through a path defined as follows. The air line 32 connects through the aperture 30 to communicate with the air chamber 28. The chamber communicates with a central axial aperture 36 extending through the spindle 16 and terminating at its outboard end in a fitted connection to a shutoff valve generally indicated at 40. The shutoff valve comprises a valve body 42 having a lower, inboard port 44 and an upper port 48. The shutoff valve 40, in its open condition, permits air passage through the inboard port 44, the valve body 42 and the outboard port 48.

The port 48 on the valve body 42 is fitted with a wand 54. The upper end of the wand 54 is connected to the port 14 of the wheel 12.

The valve body 42 also has a valve screw 50 which can be manually closed by clockwise rotation to pneumatically isolate the tire 10. A fill valve 52 on the valve body 42 permits manual inflation and deflation of the tire 10 when it is isolated from the system.

II. Description of the Pneumatic Control Circuit

Figure 2:
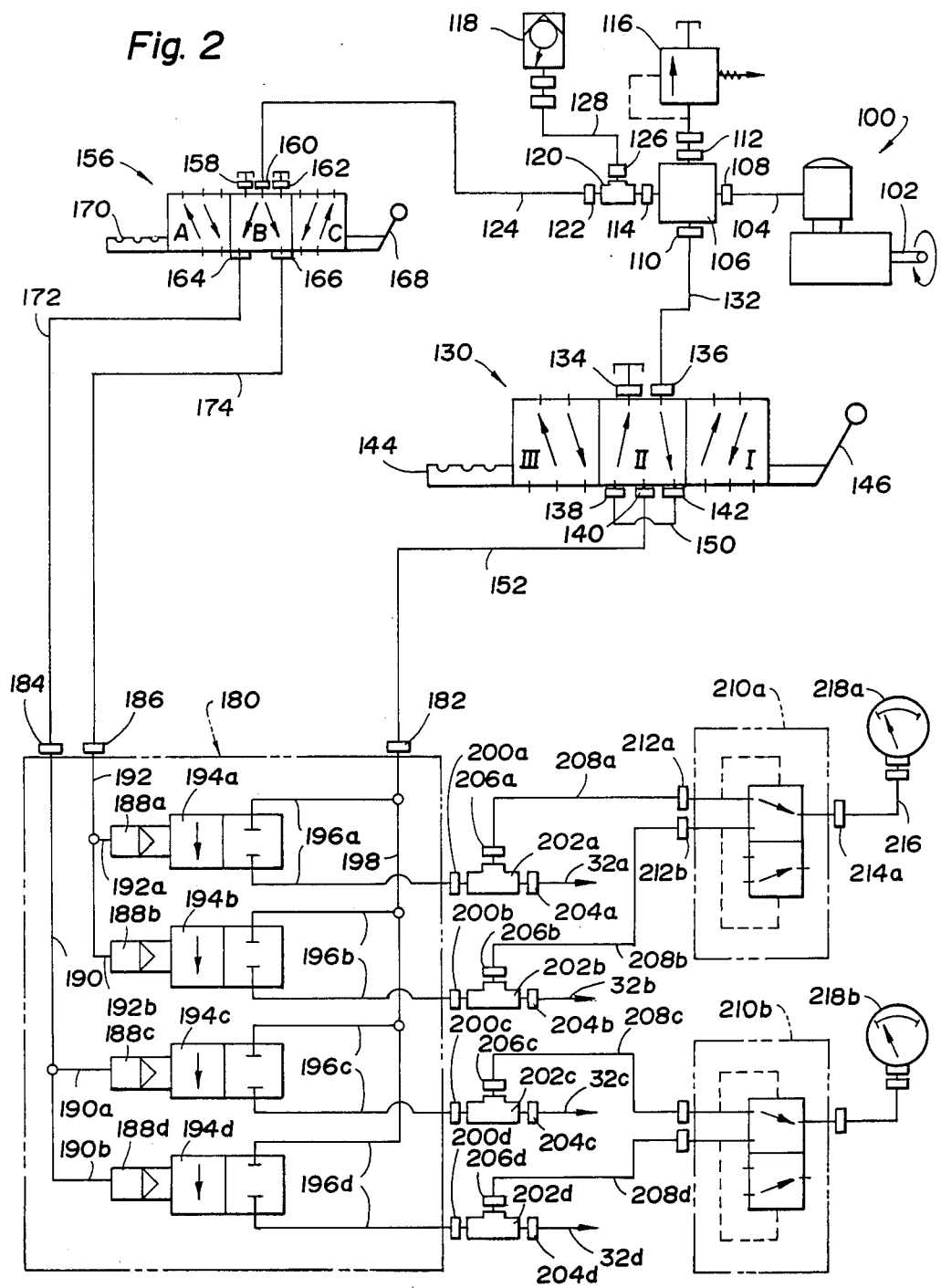
FIG. 2 is a schematic diagram of a pneumatic circuit for implementation of the present invention.

The pneumatic control circuit for implementing the automated pressurization of the vehicle tires is illustrated in schematic form in FIG. 2. The circuit symbols are chosen in convention with ANSI standards.

The pressurized air for inflating or charging vehicle tires in response to an operator command is supplied by an air pump, indicated generally at 100. The air pump is energized by the vehicle and has a duty cycle matched to the operation of the vehicle. In a practical embodiment the air pump 100 was selected as a diaphragm pump driven by the engine as schematically indicated by the shaft 102.

The pump 100 has a continuous output of pressurized air which is carried on line 104 to a cross connection 106. The cross connection 106 has an inlet port 108 which receives the pressurized air on line 104, a charge outlet port 110, a safety valve outlet port 112 and a combined auxiliary fill inlet and control line 114.

The safety valve outlet port 112 connects to a safety valve 116 which limits the air pressure level in the system (including the tires) to a predetermined upper limit, e.g. 30-35 p.s.i. This upper limit may be adjusted by changing the setting of the safety valve 116 to match operating specifications or other system constraints.

The auxiliary fill inlet port 114 connects to a common port of a tee fitting 120. The tee fitting has a second port 122 connected to a pilot line 124, and a third port 126. The port 126 connects by a line 128 to an auxiliary fill valve 118.

The function of the auxiliary fill valve 118 is to allow charging of the vehicle tires from an auxiliary source of pressurized air. This can prove valuable in the field if the pump 100 is disabled or inoperative, and in such case the auxiliary source of pressurized air may be the output of the air pump on a second vehicle. The auxiliary fill valve 118 is convenient when the vehicle is in the shop as the tires can be inflated and the system checked from an external air compressor without running the engine.

The charge outlet port 110 of the cross fitting 106 is connected by a line 132 to a mode selector valve, indicated generally at 130. In overview, the mode selector valve 130 has first, second and third operating modes or states corresponding to inflating the vehicle tires, maintaining the present tire pressurization and deflating the tires. The operating modes of the mode selector valve 130 are respectively designated I, II, III.

The mode selector valve 130 comprises upstream ports 134 and 136. The port 134 vents to the atmosphere. The port 136 receives charge air carried on line 132.

The mode selector valve 130 also includes three downstream ports 138, 140 and 142. The ports 138 and 142 are connected in common by jumper line 150. The port 140 connects to an air line 152. The air line 152 serves to deliver pressurized air to the tires when the mode selector valve is in charge or inflate mode, and carry return air to the mode selector valve from the tires when in its deflate mode.

The mode selector valve 130 is physically located in the vehicle occupant compartment, preferably on the instrument panel or at some other location convenient and accessible to the operator. The selection of operating mode is made by positioning the lever 146 into one of three set positions indicated by the notches in the symbol 144.

The selection of tires for inflation or deflation is controlled by the operator through a tire selector valve, indicated generally at 156. This valve is similar to the mode selector valve to the extent that it has first, second and third operating mode states and is manually actuated.

The tire selector valve 156 includes three upstream ports 158, 160 and 162. The ports 158 and 162 are ventilated to the atmosphere. The port 160 receives pilot air pressure on line 124.

The tire selector valve 156 also includes two downstream ports 164 and 166. The port 164 is an outlet for pilot air carried on line 172, and the port 166 is similarly an outlet for pilot air carried on line 174. In the present embodiment, the pilot signal output at port 164 serves to control the pressure adjustment of the tires on the front axle, and the pilot signal output at port 166 controls pressure adjustments on the tires of the rear axle.

The tire selector valve is preferably physically located on the vehicle instrument panel or other accessible place in the operator compartment. The lever 168 indicates that the valve 156 is manually actuatable by the operator into one of three set positions as indicated by the symbol 170.

The three selectable operating states or modes of the tire selector valve 156 are designated by the characters A, B, and C, which correspond to controlling pressurization of the tires of the front axle only, the tires of both the front and rear axles, and the tires of the rear axle only.

The mode selector valve 130 and the tire selector valve 156 operate in conjunction with a pneumatic control circuit in the form of an air manifold, indicated generally at 180. The function of the manifold 180 is to control communication of the air lines to the tires, e.g. line 32 as shown in FIG. 1, with the mode selector valve 130, in accordance with pilot control signals from the tire selector valve 156. The pilot control signals represent operator designation of the tires for inflation or deflation.

The manifold 180 includes a common port 182 connected to the line 152. The common port 182 permits passage of charge air to the selected tires when the mode selector valve 130 is in its first state, and similarly allows reverse passage of air relieved from the tires when the mode selector valve is in its third state.

The manifold 180 also includes inlet ports 184 and 186. The inlet port 184 is connected to line 172 and receives a pilot signal to control pressurization of the tires of the front axle. The port 186 is connected to the line 174 and likewise receives a pilot signal for control of the pressurization of the tires of the rear axle.

The port 184 communicates with an internal air passage 190 which divides into branches 190a and b. Similarly, the port 186 communicates with an internal passage 192 which divides into branches 192a and b. The branches 190a and b and 192a and b transmit pilot control signals to the respective input ports 188a, b, c, and d of pneumatically-controlled pilot valves 194a, b, c, and d.

Each pilot valve 194 has an open state and a closed state. In the present embodiment, the application of pilot air pressure to the port 188 in amount sufficient to overcome the opposing or counter pressure exerted by the tires will cause the valve 194 to open, and the removal of such pressure will cause the pilot valve to return to its normally closed state. The opening and closing of each pilot valve 194 correspondingly permits or restricts the flow of air through a related passage 196 which includes the two schematically indicated ports on each pilot valve 194. Each passage 196a, b, c, and d has one end communicating with a common passage 198 and another end communicating with a respective tire port 200a, b, c and d.

In a practical embodiment of the invention the pilot valves 194 were selected as pneumatically-actuated cartridge valves of the type commercially available from Humphrey Products, P.O. Box 2008, Kalamazoo, Mich. 44003 and designated Model 125 INS-A.

The tire ports 200a, b, c, and d each communicate with a respective tee fitting 202a, b, c, and d. Each tee fitting has two other ports 204 and 206 which serve as follows. The port 204 connects to the air line 32 shown in FIG. 1 to carry pressurized air to and from the vehicle tire 10. The port 206 connects to line 208 to deliver air to a shuttle valve 210.

In the present embodiment there are two shuttle valves 210a and b which correspond to the tires of the front axle and the tires of the rear axle, respectively. The function of the shuttle valve is to select the tire on the axle with the greater pressure level as the one to be read and displayed to the vehicle operator.

The shuttle valve 210a is representative and will be used for purposes of description. It includes a pair of inlet ports 212a and b which receive tire pressure signals carried on lines 208a and b, respectively. The shuttle valve 210a responds to the greater of the pressure signals and communicates the line on which that signal appears with an outlet port 214a. The outlet port connects through a line 216 to a pressure gauge 218a. The pressure gauge may be of conventional design and provide an analog or digital display. The display is located in the vehicle occupant compartment and should be visible to the operator.

The shuttle valve and pressure gauge arrangement may be modified from that shown in the disclosed embodiment to one which will meet the specifications or operator requirements of a particular system. For example, the shuttle valve 210 could be selected with four ports to take the highest pressure signal of all the tires, or it could be eliminated altogether and the pressure reading could be taken from one preselected tire.

III. System Operation

The system operation is next described in reference to the plural modes of the mode selector valve 130 and the tire selector valve 156. The mode selector valve 130 operates in a tire inflation mode I, a pressure maintenance mode II, and a tire deflation mode III. The tire selector valve 156 operates in a front axle designation mode A, a front and rear axle designation mode B, and a rear axle designation mode C. In the present description of modes I, II and III it will be assumed that the tire selector valve is in mode B, i.e. both the front and rear axles have been designated.

With the mode selector valve 130 in mode I, the upstream port 136 is in communication with the downstream port 140. The downstream ports 138 and 142 are vented to the atmosphere through upstream port 134. This arrangement communicates the pressurized air output on line 104 of the pump 100 through a series passage including the cross fitting 106, the mode selector valve 130 and the line 198 of the manifold 180.

Similarly, the pressurized air output of the pump 100 carried a pilot air pressure on line 104 is also applied through a second path defined by the connection of the cross fitting 106, tee 120, tire selector valve 156 and the lines 190 and 192 of the manifold 180.

As the pressure in these two paths builds to equal and then exceed the tire pressures (assuming uniform tire pressures for simplicity of explanation), the pilot air pressure applied to port 188 of each pilot valve 194 will cause the valve to open. This will allow air flow to the tires through each of the lines 196 passing through the pilot valves 194.

It is worthy of note that with selection of pilot valves 194 of the type previously indicated there is no venting of pilot air to the atmosphere associated with the opening of valves. This avoids a concern related to use of such a system in deep water fording requirements.

Once the tires have been inflated to the pressure level desired by the operator, as indicated by the displays on the pressure gauges 218a and b, the operator will actuate lever 146 on the mode selector valve 130 to place the valve in mode II to maintain the desired pressure.

With the mode selector valve 130 in mode II, the port 136 communicates with port 142. The jumper 150 connects port 142 to port 138. Port 138 is, in turn, vented to the atmosphere through port 134. Accordingly, in the neutral or pressure maintenance mode, the continuous output of pressurized air from the pump 100 on line 104 is vented to the atmosphere. Any pressures appearing on 104, 132 and 124 are very small and due to line losses only, and, therefore, the loading of the pump 100 is comparably small and its continuous operation in the neutral mode does not significantly diminish its service life.

If the vehicle operator should encounter soft terrain or another condition which would call for deflation of the vehicle tires, this can be accomplished by actuating the lever 146 to place the mode selector valve 130 in mode III.

With the mode selector valve 130 in mode III, the port 136 is in communication with port 142. However, port 138 (to which port 142 is connected by the jumper 150) is closed in mode III. The port 140 is communicated with port 134 to ventilate air from the tires to the atmosphere. The closure of port 138 does not allow the pump air output to vent to the atmosphere. Consequently, the air pressure on line 104 builds until it reaches the maximum system pressure as defined by the limit or setting of the pressure relief valve 116. Once having attained that pressure, it is maintained on line 104 by the response of the relief valve 116.

The maximum system pressure is now also applied to ports 188 of the pilot valves 194 through the path from the cross fitting 106 to the ports, which includes the tire selector valve 156. With the constant application of pilot air pressure at the maximum system pressure, the pilot valves 194 will open and thereafter remain open in the deflate mode.

The air from the tires flows along a serial passage which includes the previously described path through the manifold and the mode selector valve 130. At a point where the tires have been deflated to the level desired by the operator, as indicted by the pressure gauges 218a and b, the operator moves the lever 146 into mode II to maintain tire pressurization at that level. This action reduces the pilot air pressure to a negligible level (limited to line losses only) and closes the pilot valves 194 by removing the pressure at their respective ports 188.

As previously indicated, the tire selector valve 156 can be operated in either of its three modes A, B, or C independent of the mode or state of the mode selector valve 130.

With the tire selector valve 156 in mode A, the tires of the front axle are selected for pressure adjustment under control of the mode selector valve 130. In mode A, the upstream port 160 is in communication with the downstream port 166 to permit transmittal of a pilot control signal on line 174. The downstream port 164 is communicated to the atmosphere through port 158.

With the tire selector valve 156 in mode B, the tires of both the front and rear axles are selected for pressure adjustment under control of the mode selector valve 130. In this mode, the port 160 is in communication with both ports 164 and 166 to transmit the pilot control signal over both lines 172 and 174.

With the tire selector valve in mode C, the tires of the rear axle are selected for pressure adjustment under control of the mode selector valve 130. In this mode, the port 160 is in communication with port 164 to communicate a pilot control signal over line 172. The port 166 is vented to the atmosphere through port 162.

The pilot control signals carried by lines 172 and 174 are applied to the air manifold 180 through respective ports 184 and 186 to control actuation of the pilot valves 194a, b, c, and d in accordance with the previous description.

The invention has been described in an illustrative manner, and it is to be understood that the terminology which has been used is intended to be in the nature of words of description rather than of limitation.

Many modifications and variations to the present invention are possible in light of the above teachings. It is, therefore, to be understood, that within the scope of the appended claims, the invention may be practiced otherwise than as specifically described.

The embodiments of the invention in which an exclusive property or privilege is claimed are defined as follows:

1. A system for automated pressurization of pneumatic tires for a vehicle comprising:
    pump means, operatively connected to and energized by the vehicle, for providing a continuous output of pressurized air;
    mode selector means, having a first, second and third selectable operating modes corresponding to charging, pressure maintenance and venting of the tires, respectively, for permitting operator selection of the system operating mode;
    pneumatic control circuit means, interconnected among the pump means, the mode selector means and the vehicle tires and responsive to the selected operating mode of the mode selector means, for enabling tire charging in the first mode, and tire ventilation in the third mode; and
    wherein said mode selector means comprises means for diverting said continuous output to bypass said pneumatic control circuit means and closing said pneumatic control circuit means in said second mode, whereby the vehicle tires and the pneumatic control circuit means are pneumatically isolated from said continuous output of said pump in said second mode.

2. The system as defined in claim 1 wherein the pneumatic control circuit means is responsive to the first operating mode to enable communication of the pump means to the vehicle tires.

3. The system as defined in claim 2 wherein such communication is through the mode selector means.

4. The system as defined in claim 1 wherein said mode selector means further comprises means for venting said continuous output of the pump means to the atmosphere.

5. The system as defined in claim 1 wherein the pneumatic control means is responsive to the third operating state to enable ventilation of the vehicle tires.

6. The system as defined in claim 5 wherein such venting is through the mode selector means.

7. The system as defined in claim 1 wherein the mode selector means comprises a mode selector valve having first, second and third states corresponding to the like designated operating modes.

8. The system as defined in claim 1 further comprising a shutoff valve associated with each vehicle tire for selective isolation of said tire from the system.

9. The invention as defined in claim 8 and further comprising a pressure relief valve in fluid communication with said continuous output; and
    wherein said third selectable mode of said mode selector means comprises means for directing said continuous output to said tire selector means and said pressure relief valve, and blocking said continuous output from said single passageway.

10. A system for automated pressurization of pneumatic tires for a vehicle comprising:
    pump means, operatively connected to and energized by the vehicle, for providing a continuous output of pressurized air;
    mechanically actuated, pneumatic mode selector means, having first, second and third selectable operating modes corresponding to charging, pressure maintenance and venting of the tires, respectively, for permitting operator selection of the system operating mode;
    wholly pneumatic control circuit means, interconnected among the pump means, the mode selector means and the vehicle tires and responsive to the selected operating mode of the mode selector means, for enabling tire charging in the first mode, and tire ventilation in the third mode; and
    conduit means for coupling said mode selector means in fluid communication with said control circuit means through a single passageway.

11. The system as defined in claim 10 wherein the pneumatic control circuit means includes a manifold having a common port coupled to the mode selector means, a plurality of tire ports with each being coupled to one of the vehicle tires, and at least one pilot port having associated with it a pilot valve means, responsive to a pilot control signal, for controlling communication of the common port with at least one of the plurality of tire ports associated with said pilot valve means.

12. The system as defined in claim 11 wherein the manifold has a plurality of pilot ports and pilot valve means of like number to the plurality of tire ports.

13. The system as defined in claim 11 wherein the pilot valve means comprises a pneumatically-actuated valve disposed in an air path within the manifold connecting the common port and an associated tire port, said valve being responsive to a pneumatic pilot signal applied at the pilot port above the level of the actual pressure at the tire port to open and communicate said connected ports, and responsive to a pneumatic pilot signal below said level of actual pressure to close and interrupt communication of said connected ports.

14. The system of claim 13 wherein the pneumatically-actuated valve is a cartridge valve.

15. The system of claim 13 wherein the pneumatically-actuated valve is normally in the closed state.

16. The system of claim 13 wherein the pneumatically-actuated valve is in its open state when the mode selector means is in its first and third operating modes, and in its closed state when the mode selector means is in its second mode.

17. The system as defined in claim 10, further comprising signal means, responsive to the air pressure in said vehicle tires, for producing a signal representative of said pressure level.

18. The system as defined in claim 17 wherein the signal means includes a pressure gauge having an input coupled to at least one of the tires and an output in the form of a pressure-indicating signal.

19. The system as defined in claim 10 further comprising auxiliary pressurization means for receiving pressurized air from an auxiliary source to pressurize the vehicle tires when the mode selector means is in its first operating state.

20. The system as defined in claim 19 wherein the auxiliary pressurization means comprises a pneumatic fill valve connected in parallel relation to the pump means.

21. The system as defined in claim 10 wherein the pump means comprises an air pump driven by the vehicle power plant to provide a common duty cycle with the vehicle power plant.

22. The system as defined in claim 19 wherein the air pump is an engine-driven diaphragm pump.

23. The system as defined in claim 10 wherein said pneumatic control means further comprises tire selector means, for permitting selective pressurization and pressure relief of certain of the vehicle tires in said first and third operating modes of said selector means respectively.

24. The system as defined in claim 23 wherein the tire selector means includes a tire control valve having a plurality of selectable states corresponding to the selective pressurization and pressure relief of certain of the tires.

25. The system as defined in claim 10 and further comprising a pressure relief valve responsive to pressure within the system at a prescribed upper pressure limit for venting system air upon attaining said upper limit.

26. The invention as defined in claim 10 and further comprising:
means for manually actuating said mode selector means.

27. The invention as defined in claim 10 wherein said control circuit means comprises a valve means for selectively coupling each pneumatic tire individually in fluid communication with said single conduit means, and wherein said valve means is mounted wholly inboard on said vehicle remote from the wheels upon which each pneumatic tire is mounted.

28. The invention as defined in claim 27 and further comprising:
manual valve control means on each wheel for inflating and deflating said pneumatic tire independent of said mode selector means and said control circuit means.

29. The invention as defined in claim 27 and wherein said pneumatic control circuit further comprises means for actuating said valve means in response to selection of said first and third operating modes of said mode selector means.

* * * * *